United States Patent [19]
Tuckey

[11] 4,386,596
[45] Jun. 7, 1983

[54] FUEL CONDITIONING DEVICE

[76] Inventor: Charles R. Tuckey, 9684 Dexter-Pinckney Rd., Floor One, Pickney, Mich. 48169

[21] Appl. No.: 231,248

[22] Filed: Feb. 3, 1981

[51] Int. Cl.³ .......................................... F02M 31/00
[52] U.S. Cl. .................................. 123/557; 123/552
[58] Field of Search .................. 123/557, 552; 165/51, 165/52, 35

[56] References Cited

U.S. PATENT DOCUMENTS

| | | | |
|---|---|---|---|
| 916,003 | 3/1909 | Osborn | 123/557 |
| 1,219,516 | 3/1917 | Whittelsey | 123/557 |
| 1,319,718 | 10/1919 | Martin | 123/557 |
| 1,406,766 | 2/1922 | Shipp | 123/557 |
| 1,428,841 | 9/1922 | Graef | 123/546 |
| 1,945,178 | 1/1934 | Carter | 123/546 |
| 2,108,639 | 2/1938 | Bicknell | 123/552 |
| 3,886,919 | 6/1975 | Freeman | 123/546 |
| 4,091,782 | 5/1978 | Dunnam | 123/557 |

FOREIGN PATENT DOCUMENTS

| | | | |
|---|---|---|---|
| 233046 | 3/1943 | Fed. Rep. of Germany | 165/35 |
| 2245491 | 4/1974 | Fed. Rep. of Germany | 123/122 H |

*Primary Examiner*—Ronald H. Lazarus
*Attorney, Agent, or Firm*—Barnes, Kisselle, Raisch, Choate, Whittemore & Hulbert

[57] ABSTRACT

A fuel conditioning device having temperature controlled fuel duct to vary the residence time of the fuel within the device to regulate fuel temperature and allow water entrapped in the fuel to separate from the fuel under the influence of gravity.

6 Claims, 5 Drawing Figures

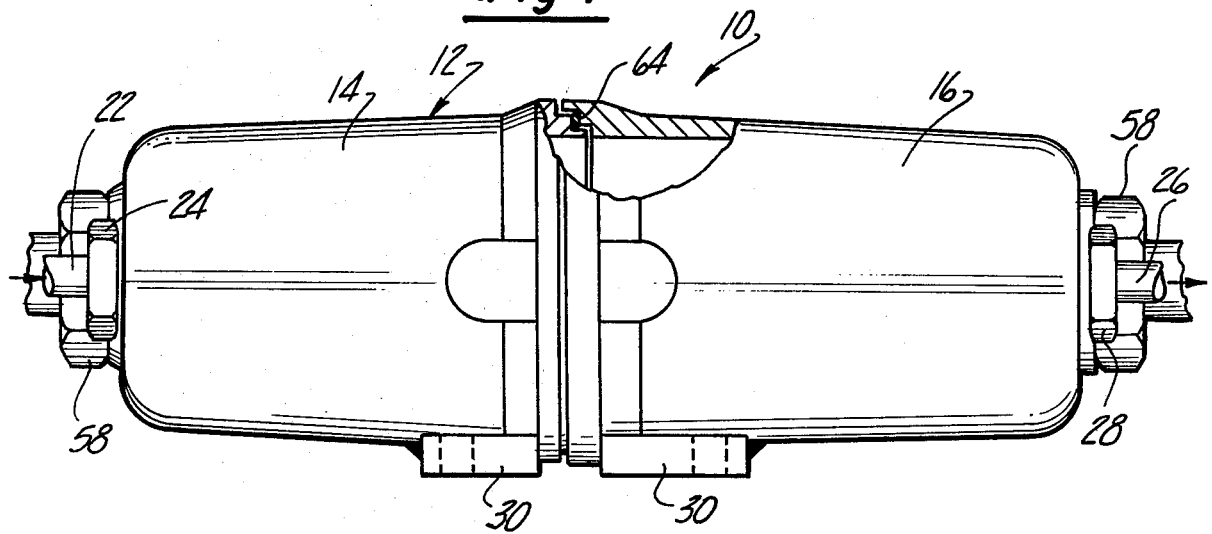
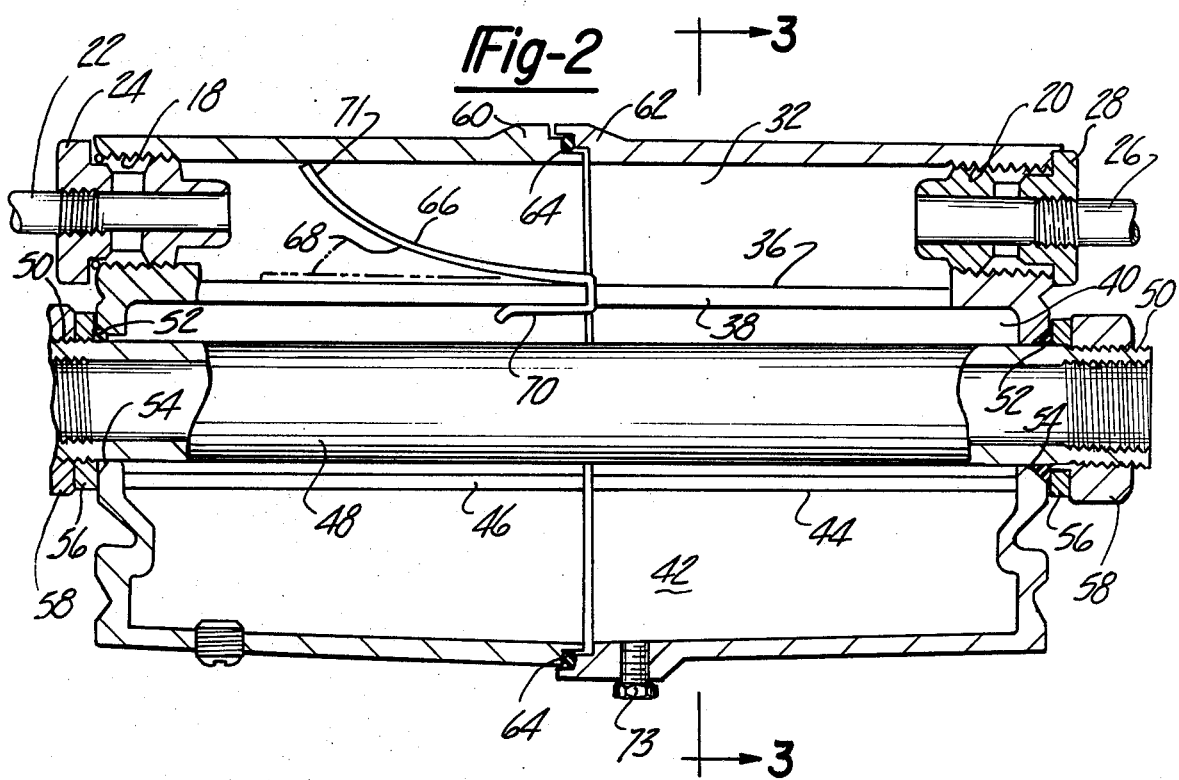

FUEL CONDITIONING DEVICE

This invention relates to fuel conditioning devices and in particular to devices for heating fuel and separating moisture therefrom.

One of the problems in storage of hydrocarbon based fuels such a diesel fuel is that moisture condenses in the interior of storage tanks. The presence of moisture is undesirable and requires removal to insure efficient use of the fuel. Also, diesel fuel is commonly used as a source of fuel for engines on large trucks and tractor-trailer combinations and it is desirable from the standpoint of economy to use lower grades of fuel. For example, number 2 diesel fuel can be used in most truck operations during summer months. However, in winter months, fuel of this grade forms wax crystals which jam fuel filters and the like and prevent efficient fuel use. Consequently, winter operation usually requires use of a higher grade of fuel or the lower grade must be heated in order to be utilized effectively. Such heating, however, must be controlled since excess fuel temperature also is undesirable and leads to inefficient operations.

Various complex and sophisticated devices have been proposed to heat fuel and separate moisture from the fuel. However, such devices frequently require manual controls and are expensive to manufacture and maintain.

It is an object with the invention to provide a fuel conditioning device by which fuel can be maintained at a predetermined temperature and in which moisture is separated for subsequent removal.

Another object of the invention is to provide a fuel conditioning device in which heating of fuel is accomplished automatically without requiring attention and manual control.

Another object of the invention is to provide a fuel conditioning device which can be conveniently disassembled for servicing.

The objects of the invention have been attained by a fuel conditioning device which comprises a first housing member having a fuel inlet and second housing member having a fuel outlet which are joined together to form a housing having longitudinally extending and parallel chambers in the form of a fuel duct for the passage of fuel between the inlet and the outlet ports, a heating chamber in fluid communication with the fuel duct and a moisture accumulating chamber in communication with the heating chamber. A heat tube extends longitudinally within the heating chamber and acts to hold the housing members together as well as to circulate a heated fluid to provide a source of heat for fuel in the chamber. A drain is located at a lower portion of the moisture accumulating chamber to allow withdrawal of the accumulated moisture which has separated from the heated fuel and is stored until its removal. The fuel duct has a temperature responsive valving arrangement which is adapted to permit substantially direct fuel flow between the inlet and the outlet when the temperature of the fuel is above some predetermined level and acts to divert fuel to the heating chamber where it can be heated when the fuel is below the predetermined temperature level. Diverting of the fuel increases the residence time within the housing to facilitate heating and moisture removal and the formation of a separate moisture accumulating chamber resists return of the separated moisture to the fuel under turbulent conditions that might be encountered under certain engine operating conditions.

The objects of the invention will become apparent from the following description and from the drawings in which:

FIG. 1 is a top view of a fuel conditioning device embodying the invention;

FIG. 2 is a sectional view taken along the longitudinal axis of the device in FIG. 1;

Figure 3:
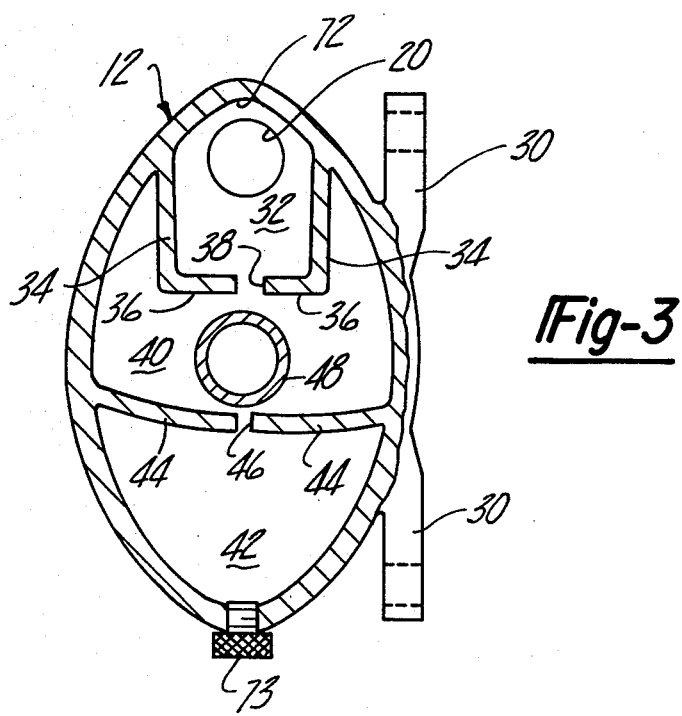
FIG. 3 is a cross-sectional view taken along line 3—3 in FIG. 2.

A fuel conditioning device embodying the invention is designated generally at 10 and includes a housing 12 formed by a pair of housing members 14 and 16. The housing member 14 includes a threaded fuel inlet port 18 and the housing member 16 forms a threaded fuel outlet port 20. The inlet port 18 is adapted to be connected to a supply of fuel such as a fuel tank on a truck by way of a conduit 22 detachably connected to the inlet port 18 by way of a fitting 24. Similarly, the outlet port 20 is connected to an outlet conduit 26 by way of a fitting 28 to communicate with a combustion source such as an engine, not shown.

Housing 12 is generally elongated and has an oval cross-section as shown in FIG. 3. The housing members 14 and 16 preferably are diecast with integrally formed bracket members 30 which faciliate mounting to walls or bracket members, not shown, to position the housing 12 in a substantially horizontal position.

The upper end of the housing 12 is formed with any elongated fuel duct 32 extending longitudinally of the housing 12 and as seen in FIG. 3, has generally parallel sidewalls 34 and a bottom wall 36. The bottom wall 36 is provided with an elongated slot 38 extending substantially the full length of a fuel duct 32.

The housing 12 also is formed with a heating chamber 40 which communicates with the fuel duct 32 by way of the slot 38. The bottom portion of a housing 12 forms a moisture accumulation chamber 42 separated from the heating chamber 40 by a baffle or wall 44 having a slot 46 providing communication between the heating chamber 40 and the moisture accumulating chamber 42.

The heating chamber 40 has a heat tube 48 that extends substantially longitudinally of the housing 12 and is disposed immediately above the baffle 44 and slot 46. The heat tube 48 has opposite threaded ends as indicated at 50 which extend to the exterior of the housing 12. Each of the ends of the heat tube 48 is adapted to receive a sealing ring 52 fitted for sealing engagement with a beveled seat 54 forming a part of the exterior end wall of each of the housing members 14 and 16 and also with the outer surface of the heating tube 48. The ends of the heat tube 48 also receive a sealing washer 56 and nuts 58. When the nuts 58 are tightened, they force the washers 56 against the sealing rings 52 and distort them into sealing engagement with the seats 54 and the outer surfaces of the heat tube 48. At the same time, the opposed nuts 58 act to hold the housing members 14 and 16 together so that adjoining lips 60 and 62 of the housing members 14 and 16, respectively, tightly engage a sealing ring 64 to form a unitary fluid tight housing 12. This particular construction allows for easy assembly of the various components of the device 10 by the use of simple tools and obviates the need for welding, brasing, soldering or other complex permanent assembly techniques. Also, the arrangement of the heating tube 48 is such that the threads and the sealed connection at the opposite ends of the tube are exterior of the housing 12 so that the fluid in the heating tube is completely isolated from the fuel within the housing thereby minimizing leakage problems.

Figure 4:
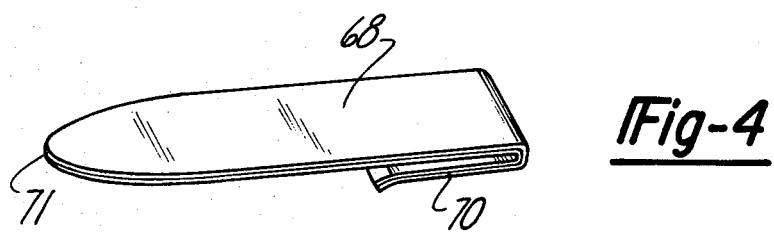
FIG. 4 is a view of the valve element seen in the assembly in FIG. 2.

Referring now to FIG. 2, the fuel duct 32 is provided with a temperature responsive valve device 66 in the form of a bi-metal leaf element 68 which is generally flat in transverse cross-section. Under high temperature conditions, the leaf element 68 also is substantially flat in its longitudinal direction as seen in FIG. 4. One end of the leaf element 68 is provided with a clip portion 70 which together with the main portion of the leaf element forms a U-shaped portion. In the assembled condition seen in FIG. 2, the U-shaped portion engages opposite sides of the relatively flat bottom wall 36 of the fuel duct 32 so that the housing members 14 and 16 clamp the leaf element 68 in position. When the temperature of the leaf element 68 is relatively low, the leaf element forms a curve such as seen in FIG. 2. The end 71 of the valve element 68 seen in FIG. 4 is of a curved configuration to conform to the shape of the upper curved wall 72 of the fuel duct 32 as viewed in FIG. 3.

As viewed in FIG. 2, the thermally responsive valve 66 is held in its closed position which would be assumed under relatively low temperature conditions. Under such conditions some or all of the fuel from the conduit 22 is diverted by the leaf element 68 which acts to close the fuel duct 32 so that fuel must flow through the slot 38 upstream from the valve element 68. This causes fuel to enter the heating chamber 40 where fuel comes in contact with the heat tube 48. The heat tube 48 is connected to a source of heated fluid, for example, the heated water of the engine cooling system. The heat tube 48 is in close proximity to the baffle 44 which acts to contain the heat within the heating chamber 40. If desired, the heat transfer tube 48 can be provided with fins, not shown, to facilitate heat transfer between the tube 48 and the fuel.

From the heating chamber 40 heated fuel will return through the portion of slot 38 downstream of the valve element 68 to enter the outlet port 20 for delivery to the combustion source by way of the outlet conduit 26.

During flow of fluid with the valve element 66 in its closed position as viewed in FIG. 2 water will tend to separate from the fuel and drop by gravity through the upstream portion of the slot 38, around the heat tube 48 and through the slot 46 in baffle 44 to the moisture accumulating chamber 42.

If the temperature of fuel is at some elevated temperature, for example, 100° F. or as the temperature of the fuel increases due to passage through the heating chamber 40, the valve element 68 will respond to the increased temperature and move toward a flat position in which it substantially closes the left end of the slot 38 as viewed in FIG. 2. Under such conditions the flow of fuel is substantially directed from the fuel inlet port 18 to the fuel outlet port 20. Even during such fluid flow, water in the fuel will tend to separate and move along the lower wall 36 of the fuel duct 32 until it passes over the valve element 68 and reaches the open portion of the slot 38 downstream from the valve element 68. Such moisture will tend to settle into the heating chamber 40 and eventually into the moisture accumulating chamber 42 while the main body of fuel will enter the outlet port 20 and conduit 26. To facilitate separation of the fuel and water the outlet port 20 is located in space relation above the bottom wall 36 to assist trapping water within the housing 12.

Figure 5:
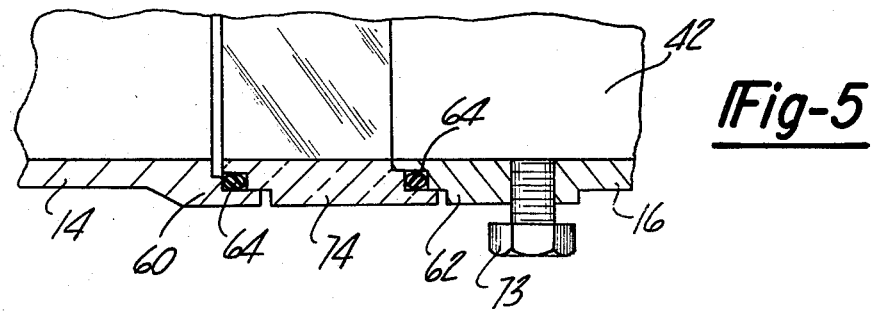
FIG. 5 shows an alternate construction providing a sight glass by which the moisture content within the device can be observed.

The bottom wall 75 of the moisture accumulating chamber 42 is provided with a drain plug 73 by which the water content of the chamber 42 can be periodically drained. This typically is done each time the fuel tank is filled. However, to facilitate such drainage and particularly inspection, the two housing member 14 and 16 can be separated at the lips 60 and 62 by a third housing member or spacer ring 74 as illustrated in FIG. 5. Such a ring 74 can be made of transparent plastic material making it possible to visually inspect and observe the level of moisture in the chamber 42 to determine the appropriate time at which drainage should be performed. The ring 74 can be easily added to the housing members 14 and 16 by using a slightly longer heat tube 48 and an additional seal 64.

It should be understood that the bi-metal valve element 68 can assume partially opened or partially closed positions, that is, it can modulate over some selected temperature range. By way of example, with some grades of fuel, temperatures below 70° F. may be considered cool and the optimum operating temperature may be considered to be no greater than 100° F. With this being the desired temperature range, the leaf element 68 can be selected with temperatures responsive characteristics such that for any temperature below 70° F. it will assume the curved or closed position illustrated in FIG. 2 to divert fuel through the heating chamber 40. For any temperature in excess of 70° F. the valve element 68 will respond and tend to straighten and partially open the fuel duct 32 to allow at least some of the fuel to pass directly from the fuel inlet port 18 to the outlet port 20. As the temperature of the fuel in duct 32 approaches 100°, the leaf spring 68 will have moved to its flat condition shown in broken line in FIG. 2. In that position the valve element 68 substantially closes the upstream portion of the slot 38 in the bottom wall 36 so that substantially all of the fuel being delivered from the inlet conduit 22 is delivered directly through the fuel duct 32 to the fuel outlet conduit 26. In this manner the valve element 68 can modulate between open and closed positions tending to maintain the fuel at the optimum temperature of 100° F.

Moisture which has been separated from the fuel and accumulated in the chamber 42 is maintained in separated condition from the fuel flowing in the remainder of the housing by the baffle wall 44. Even under extreme turbulent conditions such as encountered when operating a vehicle on rough surfaces, the accumulated water is retained in chamber 42 and return flow into the fuel stream is resisted by the baffle wall 44 and by the heat tube 48 which is in close proximity with the slot 46.

When it is desired to service the interior of the fuel conditioning device 10, disassembly is accomplished by removing one or the other of the nuts 58 and the associated washer 56 and sealing ring 52 so that the associated housing member 14 or 16 may be separated from the remaining housing member. This makes it possible to clean the unit or replace parts such as the temperature responsive valve element 68, seal 64 or the fuel filter, which is not shown, but which can be disposed in duct 32 in association with the fuel outlet port 20. A fuel conditioning device has been provided in which an elongated housing is formed of a pair of die cast members to form a fuel duct, a heating chamber and a moisture accumulating chamber which are disposed generally parallel to each other and in which the housing elements are held together by a heat tube passing longitudinally of the housing. The fuel duct is controlled by a thermally responsive valve so that under cold conditions fuel is diverted through the heating chamber to be heated and under warm conditions, the fuel is permitted to pass substantially directly between the inlet and the outlet. The arrangement of chambers is such that water separating from the fuel is accumulated in a separate chamber for periodic drainage and removal from the fuel system.

The embodiments of the invention in which an exclusive property or privilege is claimed are defined as follows:

1. A fuel conditioning device comprising: an elongated housing forming a fuel duct and a heating chamber extending longitudinally thereof and communicating with each other, a fuel inlet port and a fuel outlet port formed in walls of said housing and communicating with opposite ends of said fuel duct, a temperature responsive valve disposed between said duct and said heating chamber and being movable from an open position permitting substantially direct communication between said inlet and said outlet ports and a closed position diverting fuel from said inlet port to said heating chamber, said temperature responsive valve being a bimetal element in the form of an elongated leaf which is in its open position at a relatively high temperature and in its closed position when the temperature is relatively low, and said fuel duct having a slot extending longitudinally thereof, said leaf having one end supported in said duct in fixed position adjacent said slot, the other end of said leaf being movable relative to said slot to open and close said slot.

2. A fuel conditioning device comprising: an elongated housing forming a fuel duct and a heating chamber extending longitudinally thereof and communicating with each other, a fuel inlet port and a fuel outlet port formed in walls of said housing and communicating with opposite ends of said fuel duct, a temperature responsive valve disposed between said duct and said heating chamber and being movable from an open position permitting substantially direct communication between said inlet and said outlet ports and a closed position diverting fuel from said inlet port to said heating chamber, said housing including a pair of mating housing members forming said inlet and outlet ports, respectively, and a heating tube extending through said heating chamber, said tube having fastening means at opposite ends to urge said housing members into fluid tight relationship with each other.

3. A fuel conditioning device comprising: an elongated housing forming a fuel duct and a heating chamber extending longitudinally thereof and communicating with each other, a fuel inlet port and a fuel outlet port formed in walls of said housing and communicating with opposite ends of said fuel duct, a temperature responsive valve disposed between said duct and said heating chamber and being movable from an open position permitting substantially direct communication between said inlet and said output ports and a closed position diverting fuel from said inlet port to said heating chamber, a heating tube disposed in said heating chamber and extending through said housing longitudinally thereof for conveying heated fluid, a longitudinally extending baffle structure extending longitudinally of said housing and below said heating tube to form a lower wall of said heating chamber and form a water accumulation chamber below said heating chamber, the opposite ends of said heating tube being threaded at the exterior of said housing, seal means engageable with said tube and an exterior wall surface of said housing, and nuts on said threaded ends forcing the associated seals into sealing engagement with the ends of said tube and the ends of said housing.

4. A fuel conditioning device comprising: an elongated housing forming fuel duct and a heating chamber extending longitudinally thereof and communicating with each other, a fuel inlet port and a fuel outlet port formed in walls of said housing and communicating with opposite ends of said fuel duct, a temperature responsive valve disposed between said duct and said heating chamber and being movable from an open position permitting substantially direct communication between said inlet and said outlet ports and a closed position diverting fuel from said inlet port to said heating chamber, said housing including a pair of mating housing members forming said inlet and outlet ports, respectively, and a heating tube extending through said heating chamber, said tube having fastening means at opposite ends to urge said housing members into fluid tight relationship with each other, said fuel outlet being disposed above the bottom of said fuel duct.

5. A fuel conditioning device comprising: an elongated housing forming a fuel duct and a heating chamber extending longitudinally thereof and communicating with each other, a fuel inlet port and a fuel outlet port formed in walls of said housing and communicating with opposite ends of said fuel duct, a temperature responsive valve disposed between said duct and said heating chamber and being movable from an open position permitting substantially direct communication between said inlet and said outlet ports and a closed position diverting fuel from said inlet port to said heating chamber, said housing further comprising a longitudinally extending baffle structure extending longitudinally of said housing and below said heating tube to form a lower wall of said heating chamber and form a water accumulation chamber below said heating chamber, and said housing further comprising a third housing member disposed between said pair of housing members, at least a portion of said third housing member being transparent to allow visual determination of the level of water in said water chamber.

6. A fuel conditioning device comprising: an elongated housing forming a fuel duct and a heating chamber extending longitudinally thereof and communicating with each other, a fuel inlet port and a fuel outlet port formed in walls of said housing and communicating with opposite ends of said fuel duct, a temperature responsive valve disposed between said duct and said heating chamber and being movable from an open position permitting substantially direct communication between said inlet and said outlet ports and a closed position diverting fuel from said inlet port to said heating chamber, said fuel duct having openings to form a diversion path of fuel flow into and out of said heating chamber in the direction of said outlet port, said temperature responsive member comprising a bi-metal element to serve as a valve disposed in said fuel duct movable with temperature changes from a position closing an opening to allow fuel flow directly through said fuel duct to an open position blocking said fuel duct to direct fuel in said diversion path through said heating chamber toward said fuel outlet.

* * * * *